Figure 1:
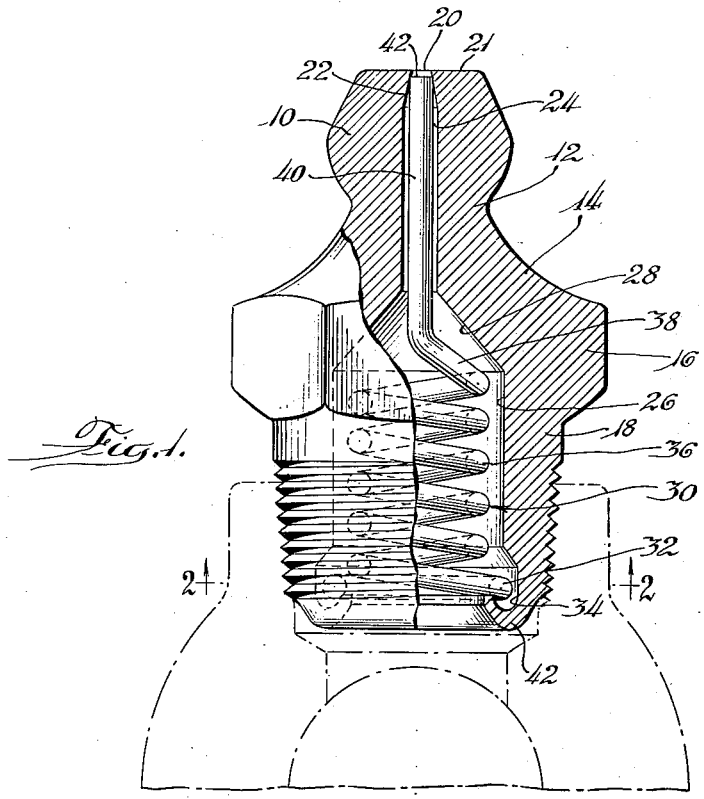

April 11, 1950 G. F. THOMAS 2,504,055
HIGH-PRESSURE LUBRICANT RECEIVING FITTING
Filed Oct. 8, 1948

Inventor:
George F. Thomas
By Hinkle, Horton, Ahlberg, Hansmann & Wupper
Attorneys.

Patented Apr. 11, 1950

2,504,055

UNITED STATES PATENT OFFICE 2,504,055

HIGH-PRESSURE LUBRICANT RECEIVING FITTING

George F. Thomas, River Forest, Ill., assignor to Stewart-Warner Corporation, Chicago, Ill., a corporation of Virginia Application October 8, 1948, Serial No. 53,406

3 Claims. (Cl. 184—105)

My invention relates generally to lubricant receiving fittings used in high pressure lubricating systems.

It is an object of the invention to provide an improved lubricant receiving fitting for high pressure lubricating systems, which is of simplified construction and may be manufactured at a lower cost than fittings of the prior art.

Lubricant receiving fittings for high pressure lubricating systems as used on automobiles and various other types of equipment and machinery are made and used in enormous quantities. For example, an average automobile may have as many as fifteen of these fittings secured to various bearings requiring high pressure lubrication at intervals, and since the annual production of automobiles in the United States has recently been in the order of five million, it will appear that many millions of these fittings are required solely by the automotive industries. When the large number of fittings which are used on innumerable other kinds of machinery, such as farm machinery, road building machinery and equipment, conveyors, and other apparatus, are taken into consideration, it will be clear that a small saving in the cost of production, in the order of a small fraction of a cent, results in a large aggregate saving. Furthermore, many manufacturers, such as manufacturers of automotive vehicles, individually order fittings of this type in enormous quantities, by the millions, so that the price at which a producer of the fittings is enabled to sell them to the manufacturers is a large factor in whether the fittings are purchased from one manufacturer or another.

It is, therefore, of utmost importance to the manufacturer of lubricant receiving fittings that they be made at the ultimate minimum in cost, without deterioration in quality or in functional operability.

As conventionally made, lubricant receiving fittings of the type here under consideration, comprises a bulbous head having a neck portion leading to a flaring increasing diameter portion, and terminate in a hexagonal wrench engaging portion and a threaded shank. In using fittings of this type, they are engaged by a coupler which has jaws which are forced, by the pressure of lubricant from a lubricant compressor into tight engagement with the neck and around the head of the fitting.

In servicing automobiles and other equipment provided with this type of fitting, the operator frequently fails to relieve the lubricant pressure on the coupler jaws prior to endeavoring to disengage the coupling from the fitting; and since the disengagement is effected by swinging the axis of the coupler out of alignment with the axis of the fitting, such failure to release the pressure, and hence to relieve the grip of the jaws, may result in breaking off the enlarged head of the fitting at the neck portion. It is, therefore, highly desirable that the metal at the neck portion be of maximum cross-sectional area compatible with the required external shape and dimensions of the fitting.

It is, therefore, a further object of the invention to provide an improved lubricant receiving fitting of the above mentioned type which has an increased cross-sectional area of metal at the neck portion so as to offer increased resistance to breaking the head from the fitting.

As manufactured in the past, most lubricant receiving fittings have been of three-part construction, namely, the metal body above mentioned, which includes a valve seating surface, a steel ball valve, and a spring to hold the ball valve against the seating surface. In such fittings the spring was generally of conical shape, and this led to the difficulty that when lubricant was supplied to the fitting at high pressure in a sudden pulse, the lubricant would force the ball rapidly away from its seat to compress the spring, and sometimes cause the coils of the spring to engage each other so tightly as to prevent any substantial flow of lubricant through the fitting. As a result, the high pressure above the ball and spring was resisted only by the relatively frail spring, and frequently broke the spring and expelled parts of the spring and the ball from the fitting into the port leading to the bearing to be lubricated. Since the spring is necessarily of relatively hard steel, it acted as an abrasive against the bearing surfaces, with resultant serious damage thereto.

In the assembly of the prior art fittings, in which a ball valve was held against its seat by a spring, it was, of course, necessary to have available a stock of the three parts and to provide facilities, either semi-automatic, or fully-automatic, for feeding the ball valves as well as the springs into the bores of the fitting during the assembly operation. Due to unavoidable errors, either through the operator's oversight or through the failure of the machine to deposit the ball valve in the fitting prior to the insertion of the spring, occasional fittings were assembled without the inclusion of the ball valve. Thus, conventional manufacturing processes required inspection of the assembled fittings to determine whether the ball valve was present, and whether the spring holding the ball valve against its seat had been inserted. Because of the very rapid rate at which the fittings are assembled, it is not economically feasible to have complete inspection of each fitting, and the inspection was, therefore, by the spot check method, which did not completely eliminate incomplete and improperly assembled fittings.

It is therefore a further object of the invention to provide an improved lubricant receiving fitting in which the spring is so conformed as not to be capable of obstructing materially the flow of lubricant through the fitting.

Figure 2:
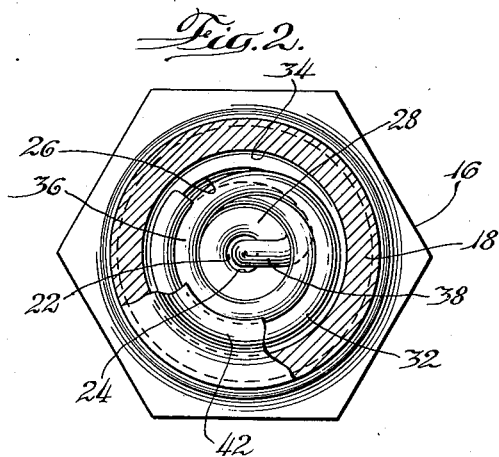

Other objects, advantages, and capabilities of the invention will become apparent from the following description, wherein reference is had to the accompanying drawings, in which Fig. 1 is substantially a longitudinal quarter-sectional view of the improved lubricant receiving fitting shown to an enlarged scale; and Fig. 2 is a transverse sectional view, taken substantially on the line 2—2 of Fig. 1.

The fitting shown in the drawings in external form and appearance is substantially identical with a form which has been sold in large quantities for a number of years. In general, it comprises a head portion 10 joined by a neck 12 with a flared portion 14, the latter terminating in a hexagonal wrench engaging part 16, and an externally threaded shank portion 18. The interior of the fitting, however, differs materially from the interiors of prior known fittings in a number of respects. The upper end face of the fitting is provided with a circular opening 20 at the end of a conical valve seat surface 22, the latter merging into a passageway 24 of relatively small diameter. The shank 18 of the fitting is provided with an axial bore 26 which is joined to the lower end of the passageway 24 by a conical chamber 28.

A spring wire 30, of uniform diameter throughout its length, is mounted within the fitting, and includes a lower turn 32 of enlarged diameter which is received in an enlarged bore 34 formed at the lower end of the bore 26. The enlarged diameter portion 32 merges into a helical portion 36, and at the upper end of the latter the wire is bent radially inwardly to the axis of the fitting, as at 38, and it is bent vertically upward along the axial line of the fitting and helical portion of the spring to provide a stem 40. The upper end 42 of the stem 40 is sheared perpendicular to the axis of the stem to provide a relatively sharp peripheral edge engageable as a valve with the conical seat 24. After the spring has been inserted in the fitting, the lower extremity 42 of the shank is curled inwardly to embrace the lowermost turn 32 of the spring and thus hold the spring within the fitting.

The dimensions of the valve seat 22, with respect to the diameter of the wire stem 40, are such that the end face 42 of the spring wire is substantially flush with the top surface 21 of the fitting, so as to minimize the size of the space in which dirt may collect.

When the fitting is coupled to a source of lubricant under pressure, the lubricant pressure acting on the end face 42 of the spring wire stem 40 will force the latter downwardly, compressing the helically coiled portion 36 of the spring, and permitting the lubricant to flow through the passageway 24. This passageway is of relatively small diameter, but is sufficiently larger in diameter than the spring stem 40 that lubricant may flow through the fitting relatively freely.

It will be noted that lubricant emerging from the lower end of the passageway 24 may flow freely through the central opening of the coil spring 30, and that the latter cannot, therefore, be compressed, as was the case with prior art constructions, to restrict the flow of lubricant through the fitting. Furthermore, the force which can be applied by the lubricant to compress the spring is limited because of the small cross sectional area of the valve end face 42. There may be a small force applied due to the friction of the lubricant flowing past the stem 40, but this will ordinarily not be an appreciable factor. The spring 30 may be made of relatively small diameter spring wire.

Due to its simple two-piece construction, the fitting may be easily and rapidly assembled.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A lubricant receiving fitting having a head and a shank, the head having a relatively small diameter longitudinal passageway extending therethrough and of decreased diameter at its outer end to form a valve seat, the shank having an enlarged bore therein, a unitary spring and valve member comprising a spring wire of uniform diameter throughout its length and having a linear portion extending through the passageway and terminating in an outer end engaging the valve seat formed at the outer end of the passageway, said spring wire having a helical portion in the enlarged bore and a portion connecting the inner end of the linear portion with the helical portion, and means forming part of the shank to hold the helical portion of the spring wire within the bore in the shank portion of the fitting with the outer end of its linear portion in engagement with the valve seat.

2. A lubricant receiving fitting having a head and a shank, the head having a relatively small diameter longitudinal passageway extending therethrough and of decreased diameter at its outer end to form a valve seat, the shank having an enlarged bore therein communicating with the inner end of the passageway, a unitary spring and valve member comprising a wire of uniform diameter throughout its length and formed with a linear portion extending through the passageway and terminating in an outer end engaging the valve seat formed at the outer end of the passageway, and means forming part of the shank to hold the wire member within the bore and passageway with the outer end of its linear portion in engagement with the valve seat.

3. A lubricant receiving fitting having a head and a shank, the head having a relatively small diameter longitudinal passageway extending therethrough and of decreased diameter at its outer end to form a valve seat, the shank having an enlarged bore therein, a unitary spring and valve member comprising a wire of uniform diameter throughout its length and formed with a linear portion extending through the passageway and terminating in an outer end engaging the valve seat formed at the outer end of the passageway, said spring member having a readily flexed portion located in the enlarged bore and joined to the inner end of the linear portion, and means forming part of the shank to hold the spring wire member within the fitting with the outer end of its linear portion in engagement with the valve seat.

GEORGE F. THOMAS.

REFERENCES CITED

The following references are of record in the file of this patent:

UNITED STATES PATENTS

| Number | Name | Date |
|---|---|---|
| 1,886,205 | Lyford | Nov. 1, 1932 |
| 2,059,701 | MacIndoe | Nov. 3, 1936 |
| 2,254,502 | Thomas et al. | Sept. 2, 1941 |
| 2,400,817 | Fox | May 21, 1946 |